US011580439B1

(12) United States Patent
Kahn et al.

(10) Patent No.: US 11,580,439 B1
(45) Date of Patent: Feb. 14, 2023

(54) FALL IDENTIFICATION SYSTEM

(71) Applicants: Philippe Richard Kahn, Santa Cruz, CA (US); Arthur Kinsolving, Santa Cruz, CA (US)

(72) Inventors: Philippe Richard Kahn, Santa Cruz, CA (US); Arthur Kinsolving, Santa Cruz, CA (US)

(73) Assignee: DP Technologies, Inc., Scotts Valley, CA (US)

( * ) Notice: Subject to any disclaimer, the term of this patent is extended or adjusted under 35 U.S.C. 154(b) by 1061 days.

(21) Appl. No.: 14/850,918

(22) Filed: Sep. 10, 2015

Related U.S. Application Data

(60) Provisional application No. 62/048,719, filed on Sep. 10, 2014.

(51) Int. Cl.
*G06N 20/00* (2019.01)
*G06N 7/00* (2006.01)
*G06N 5/02* (2006.01)
*G06N 5/022* (2023.01)

(52) U.S. Cl.
CPC ........... *G06N 20/00* (2019.01); *G06N 5/022* (2013.01); *G06N 7/005* (2013.01)

(58) Field of Classification Search
CPC ................. G06N 5/022; G06N 7/005
See application file for complete search history.

(56) References Cited

U.S. PATENT DOCUMENTS

| 8,206,325 | B1 * | 6/2012 | Najafi | A61B 5/1116 600/595 |
| 8,840,263 | B1 * | 9/2014 | Jones | A41D 13/01 362/108 |
| 10,610,111 | B1 * | 4/2020 | Tran | A61B 5/411 |
| 2006/0282021 | A1 * | 12/2006 | DeVaul | A61B 5/1117 600/595 |
| 2009/0290718 | A1 * | 11/2009 | Kahn | H03G 3/32 381/57 |
| 2011/0025493 | A1 * | 2/2011 | Papadopoulos | G08B 21/0453 340/539.12 |
| 2012/0314901 | A1 * | 12/2012 | Hanson | A61B 5/0077 382/103 |
| 2013/0231711 | A1 * | 9/2013 | Kaib | G06F 19/3418 607/5 |
| 2014/0313036 | A1 * | 10/2014 | Sweeney | G08B 21/043 340/573.1 |

OTHER PUBLICATIONS

Doukas et al, Emergency Fall Incidents Detection in Assisted Living Environments Utilizing Motion, Sound, and Visual Perceptual Components (Year: 2011).*

(Continued)

*Primary Examiner* — Ann J Lo
*Assistant Examiner* — Van C Mang
(74) *Attorney, Agent, or Firm* — Nicholson De Vos Webster & Elliott LLP; Judith Szepesi

(57) ABSTRACT

A method of determining whether a user has fallen comprises detecting a potential fall using a motion sensing device, updating a probability of the potential fall being an actual fall based on an additional sensor, and updating the probability of the potential fall being an actual fall based on user context, the user context including an identified activity prior to the potential fall.

19 Claims, 8 Drawing Sheets

(56) References Cited

OTHER PUBLICATIONS

Kwapisz et al, Activity Recognition using Cell Phone Accelerometers (Year: 2011).*
Tong et al., HMM-Based Human Fall Detection and Prediction Method Using Tri-Axial Accelerometer (Year: 2013).*
Miao Yu, Yuanzhang Yu, Adel Rhuma, "An Online One Class Support Vector Machine-Based Person-Specific Fall Detection System for Monitoring an Elderly Individual in a Room Environment", IEEE, 2013 (Year: 2013).*
Zhang, "Context-Aware Fall Detection Using A Bayesian Network", 2011 (Year: 2011).*

\* cited by examiner

FALL IDENTIFICATION SYSTEM

RELATED APPLICATION

The present invention claims priority to U.S. Provisional Application Ser. No. 62/048,719 and incorporates that application in its entirety.

FIELD

The present invention relates to identifying a user falling, and more particularly to utilizing machine learning to accurately identify a user falling.

BACKGROUND

One of the ways that people can be injured is by falling. Especially for people engaged in dangerous activities, with certain medical conditions, or older people, falls can be very dangerous. There are numerous fall detection systems available, which attempt to identify when a user has fallen, and either alert or provide assistance.

Some prior art systems and devices employ accelerometers that measure sudden changes in acceleration that may indicate a fall, such as rapid changes in acceleration followed by no movement (i.e., lying on the floor). However, the prior art systems have a significant number of false positive identifications. For example, they often cannot distinguish a fall from a user dropping the device, or from certain normal activities.

Other prior art systems use microphones and vibration detectors to identify falls based on floor vibration and audio analysis. However, not only is this computationally expensive, but it is location-bound and also cannot distinguish between falls, drops, or other incidents.

BRIEF DESCRIPTION OF THE FIGURES

The present invention is illustrated by way of example, and not by way of limitation, in the figures of the accompanying drawings and in which like reference numerals refer to similar elements and in which.

DETAILED DESCRIPTION

The present application detects a potential fall event, makes a fall hypothesis, and then determines the probability of the fall hypothesis being accurate based on data from a plurality of sensors, activity identification, user context, and other available data. In one embodiment, the system uses three types of components, a motion sensor, a barometer (pressure sensor) or other secondary sensor, and the machine learning system that enables the system to determine whether a detected potential fall was an actual fall. In addition, in one embodiment, the system determines the type of fall, as well as the severity of the fall.

The system is designed to eliminate false positives, such as stumbling while walking, and continuing to walk. In one embodiment, because the system uses the user context, it can differentiate between the motions of someone who has a wrist or a pendant wearable, someone who has a smart phone, and someone who has both. In one embodiment, if a user has a plurality of devices that include sensors, the system uses the data from a plurality of the devices, to assess the probability of the fall being an actual fall.

In one embodiment, the system relies on positive identification. By analyzing the user's context, including activity prior to the potential fall, the possible fall scenarios can be evaluated, and the actual sensor data can be compared to the possible fall scenarios that may occur from the prior activity. This enables the system to know what it is looking for and what it is not looking for. Identifying whether the potential fall was a real fall gets much easier.

In one embodiment, the system also evaluates a learned probability of false positive identifications for falls, for particular pre-fall activities. For example, if the user is running downhill, the probability of a false positive indication on a motion sensor is significantly higher than if the user is standing still. In one embodiment, the more likely the activity is prone to "false positives", the lower the initial probability of a fall when the sensor data is received. This is based on a machine learning process, in one embodiment.

The following detailed description of embodiments of the invention makes reference to the accompanying drawings in which like references indicate similar elements, showing by way of illustration specific embodiments of practicing the invention. Description of these embodiments is in sufficient detail to enable those skilled in the art to practice the invention. One skilled in the art understands that other embodiments may be utilized and that logical, mechanical, electrical, functional and other changes may be made without departing from the scope of the present invention. The following detailed description is, therefore, not to be taken in a limiting sense, and the scope of the present invention is defined only by the appended claims.

Figure 1:
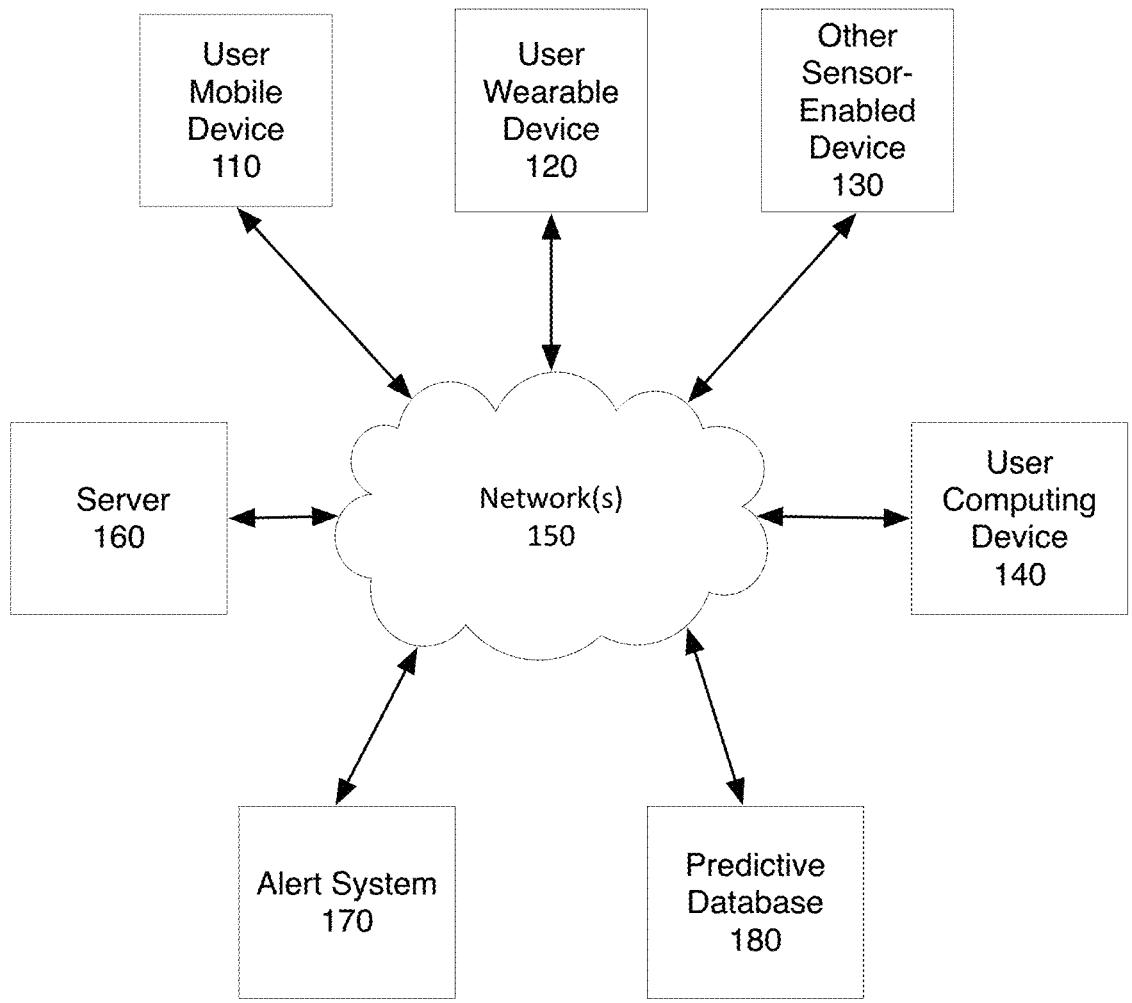
FIG. 1 is a network diagram of one embodiment of the fall identification system.

FIG. 1 is a network diagram of one embodiment of the fall identification system. The process includes at least one of a user mobile device 110, user wearable device 120, or other sensor-enabled device 130. The user has devices which include at least two sensors. In one embodiment, two devices each having one sensor may be used. In one embodiment, one device with at least two sensors is used. In one embodiment, one of the sensors is a motion sensor such as an accelerometer.

In one embodiment, the user mobile device 110 is a smart phone. In one embodiment, the user wearable device 120 is a watch, eyeglasses, wristband, or similar item designed to be worn on the user's body at all times. Other sensor enabled devices 130 may include MP3 players, personal organizers, or other devices which are carried by a user and include at least one sensor. In one embodiment, when there are multiple devices, e.g. a user has a smart phone 110 and a wristband 120 including sensors, the systems work together using a low power connection, such as BLUETOOTH BLE™, a cellular network connection, a wireless network connection, or another type of connection. These connections, or other methods of interconnecting these elements, are collectively shown as network(s) 150.

In one embodiment, the system may further interact with the user's computing device 140. The user's computing device 140 may be laptop or desktop device, a server, or a cloud-based service available via network 150. In one embodiment, the system may distribute the processing across the available user devices. In one embodiment, the system may further distribute the processing across the user devices 110, 120, 130, and 140, as well as taking advantage of server 160. In one embodiment, the system may be an application running on the user mobile device 110, user wearable device 120, and/or other sensor-enabled device 130. In one embodiment, the processing is done by only one device, and that device receives data from other devices.

The server 160 in one embodiment may provide processing power, as described above. In one embodiment, the server 160 may also provide a downloadable application to the user mobile device 110. Additionally, server 160 may also analyze cumulative data from a plurality of users' systems, to upgrade the machine learning algorithms and predictive algorithms.

Alert system 170 is used to alert the user and/or third parties about a fall. In one embodiment, alert system 170 is part of the user mobile device 110 or the user computing device 140. The alert system 170 may also be part of server 160.

Predictive database 180 stores the data from the users for analysis. Although server 160 and predictive database 180 are shown as singular units, one of skill in the art would understand that they may be distributed servers and/or databases. In one embodiment, the server 160 and predictive database 180 may be cloud-based services provided through third parties.

Figure 2:
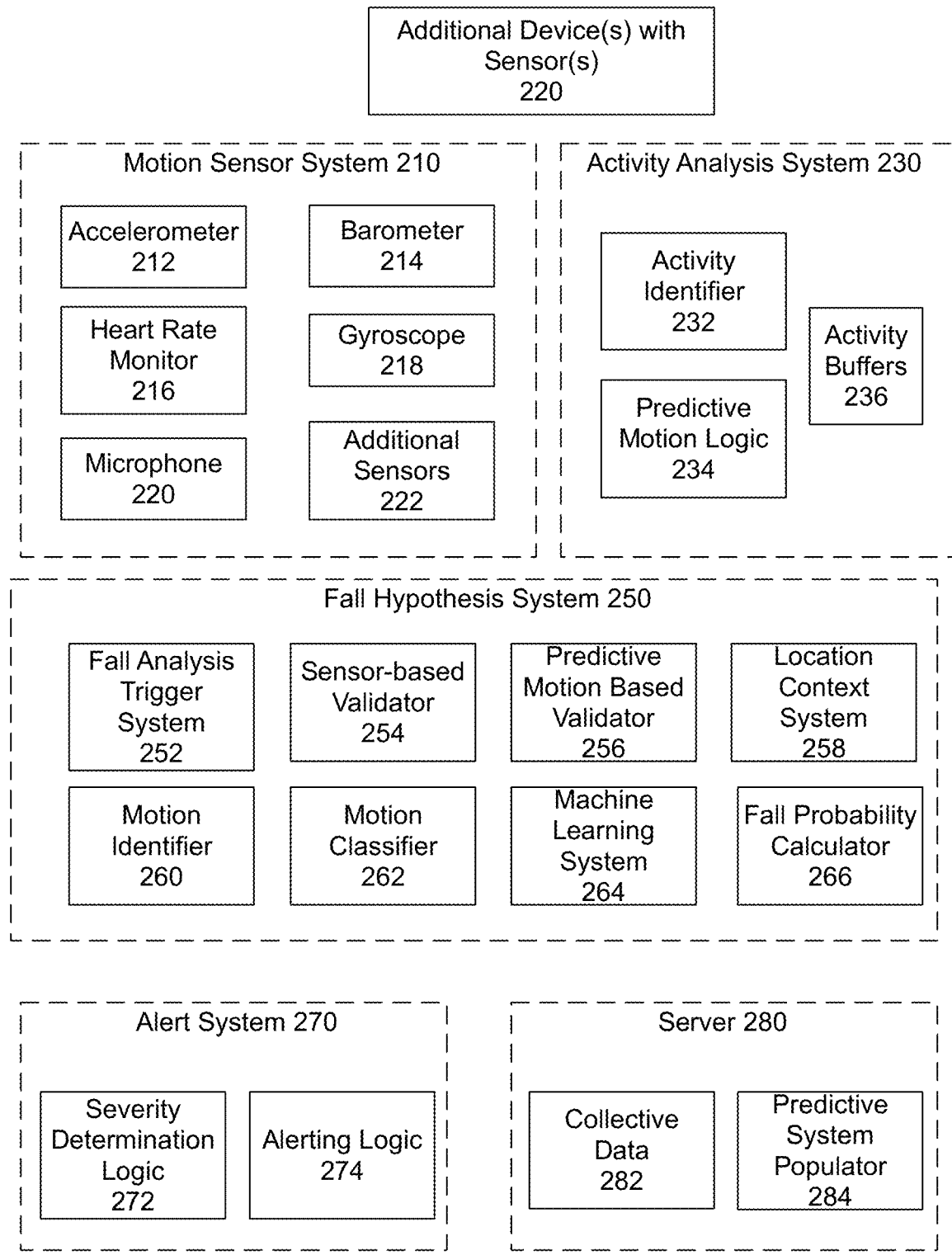
FIG. 2 is a block diagram of one embodiment of the fall identification system and other systems that may work with the fall identification system.

FIG. 2 is a block diagram of one embodiment of the fall identification system 205 and other systems that may work with the fall identification system. The system 205 includes a motion sensor system 210, an activity analysis system 230, and a fall hypothesis system 250. The system may further include alert system 270. In one embodiment, the system may be implemented in one or more user devices, a user device and a server, or in a server. In one embodiment, at a minimum the motion sensor system 210 is located in a body-worn device. The analysis system 230 and hypothesis system 250 may be implemented by a processor on a user mobile device, such as a smart phone. In one embodiment, some or all of the processing may take place on a processor in a remote server, or a cloud platform in a distributed manner.

In one embodiment, the system may also receive data from additional devices with sensors 220. In one embodiment, the additional devices may include some or all of the elements described with respect to fall identification system 205. For example, the devices may be a user's smart phone and tablet computer, both carried by the user. Both systems may include the processor and capability to implement the fall hypothesis system 250. In one embodiment, in such a scenario, one of the devices acts as the master device for calculations. In one embodiment, the secondary device may then be used to provide additional processing power, as well as additional sensor data.

The motion sensor system 210 may include one or more of an accelerometer 212, barometer 214, gyroscope 218, microphone 220, heart rate monitor 216, and other sensors 222. In one embodiment, the sensors in sensor system 210 may monitor the user's motion as well as physiological state. Other sensors currently available or later invented may also be included. For example, a simple blood sugar analysis, blood pressure analysis, blood oxygenation analysis or other sensor analytics may be included. In one embodiment, as new body-worn devices are created, with increasingly sophisticated sensors, the fall hypothesis system 250 may take data from such new sensors, and integrate it into the analytics.

Activity analysis system 230 includes activity identifier 232 which identifies the user's activity based on data from the sensors 210. In one embodiment, activity identifier 232 uses activity buffers 236 to track the user's activity data. This information, historically buffered data and current data, are used by predictive motion logic 234 to calculate predictions for the possible next motions of the user.

As described in more detail below, the system is designed to identify deviations from normal moment, and determine whether the deviation was the result of a fall. Fall analysis trigger system 252 utilizes the activity data from activity analysis system 240, in one embodiment.to create an initial percentage chance that a movement was a fall. Sensor-based validation validates the hypothesis and/or adjust he probability based on data from other sensors, either within the device or external to the device. Predictive motion based validator 256 uses the future motion prediction from activity analysis system 230 to fit the motion that may be a fall. Location context system 258 utilizes location data to validate the user's fall hypothesis. In one embodiment, location data may include GPS (global positioning system), wireless sensor routing, cellular network location, etc. In one embodiment, the location context system 258 also provides the user's environmental context. This is useful in determining not only whether there was a fall but also the severity of a fall.

Machine learning system 264 utilizes data from analytics as well as user input to over time develop a system that creates a highly accurate fall prediction algorithm. The system is designed, in one embodiment, to have a machine learning system 246 that accurately identifies falls, and identifies dangerous falls, which may need a response. In one embodiment, in addition to fall analytics, fall hypothesis system 250 provides motion identification 260 and/or classification 262. In one embodiment, the machine learning system 264 also provides analytics to determine if the user's movement pattern indicates another problem, such as a stroke or heart attack.

Alert system 270 calculates severity of the fall or problem 272, based on context, and sensor data. Alerting logic 274 may send an alert to one or more designated parties, medical professionals, or emergency services. Altering logic 274 may also provide feedback to the user, to enable them to correct any developing medical issues before they are severe.

In one embodiment, server 280 may be used to obtain anonymized collective data, and populate the probabilities and evaluations in classifier 262, validators 254, 256, and other elements. In one embodiment, the server 280 is used to obtain population data based on data from a large number of users. In one embodiment, processors in server 280 may also provide some or all of the processing power for the analytics described.

Figure 3:
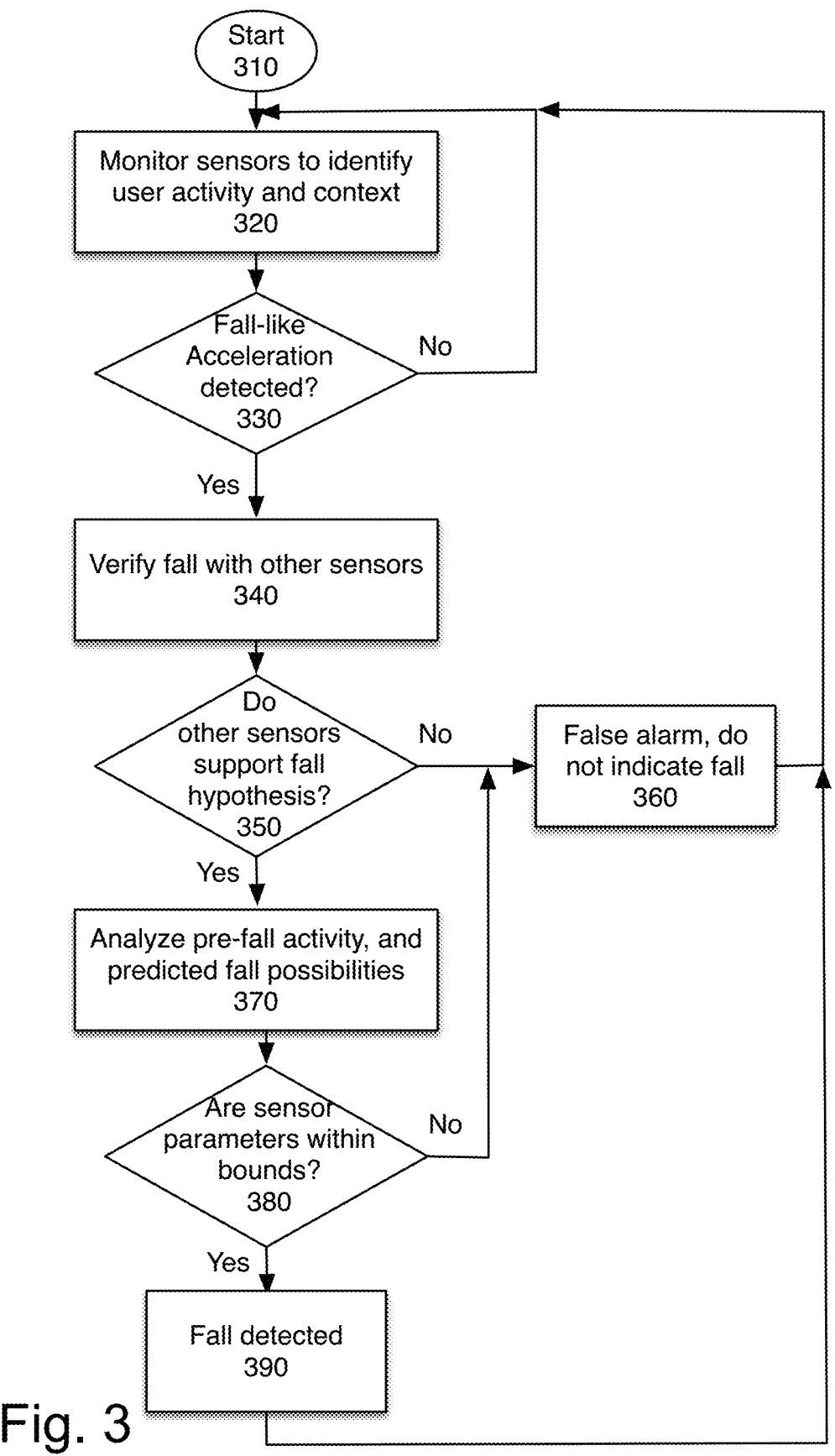
FIG. 3 is an overview flowchart of one embodiment of how the fall identification system works.

FIG. 3 is an overview flowchart of one embodiment of how the fall identification system works. The process starts at block 310.

At block 320 the sensor data is used to identify the user's current activity and context. In one embodiment, the process described in co-pending application Ser. No. 11/871,151 is used. In one embodiment, the context may include determining the user's current location, environment, and user activity. The context may also include the time of day, current weather conditions, and other relevant information that may be used to evaluate the sensor data. In one embodiment, this monitoring may include daytime monitoring of activity, as well as night time monitoring of sleep. In one embodiment, the body-worn device of pending application Ser. No. 13/622,325 may be used for this monitoring. In one embodiment, the monitoring may include data from the body-worn device, and a smart phone carried by the user.

At block 330, the process determines whether a fall-like acceleration is detected. In one embodiment, a motion sensor such as an accelerometer or gyroscope may be used to detect the fall-like movement. If no fall-like movement is detected, the process continues to block 320, and continues monitoring the user's activity and context.

If a fall-like acceleration is detected, at block 340, the acceleration data is verified with other sensors. These other sensors may be other sensors in the same wearable device or mobile device, or sensors from another device also carried by the user.

At block 350, the process determines whether the other sensors support the fall hypothesis. If the other sensors oppose the fall hypothesis, in one embodiment at block 360 the fall hypothesis is refuted, and the potential fall is labeled as a false alarm. In one embodiment, this information may be used to set probabilities for future evaluations of potential falls.

If the other sensors support the fall hypothesis, the process continues to block 370. At block 370, the process analyzes the pre-fall activity and predicted fall possibilities associated with the user's prior context and activity.

At block 380, the process determines whether the sensor parameters detected in the fall-like acceleration are within the bounds of possible falls, given the user's context and activity. In one embodiment, by using the activity and context information, the expected and possible movements of the user are constrained. This enables a cleaner comparison of the fall-like acceleration to the expected and possible movements, to determine whether the user actually fell or not. If the sensor parameters are not within bounds, the process continues to block 360.

If the sensor parameters are within bounds, the process continues to block 390 and tags the potential fall as an actual fall. In one embodiment, if appropriate, the process may also send out an alert or otherwise react to identifying a fall. The process then returns to block 320, to continue monitoring the sensor data.

In one embodiment, instead of tagging the potential fall as a false alarm or a real fall, the system assigns a probability to the potential fall. The probability may be increased and decreased based on the other sensor data, prefill activity data, and context data. In one embodiment, if the resultant probability is above a threshold, the potential fall is classified as a fall. In one embodiment, the system requests confirmation from the user. In one embodiment, the user may confirm or deny the fall, and this data is fed back into the system for classifying future detected data.

Figure 4:
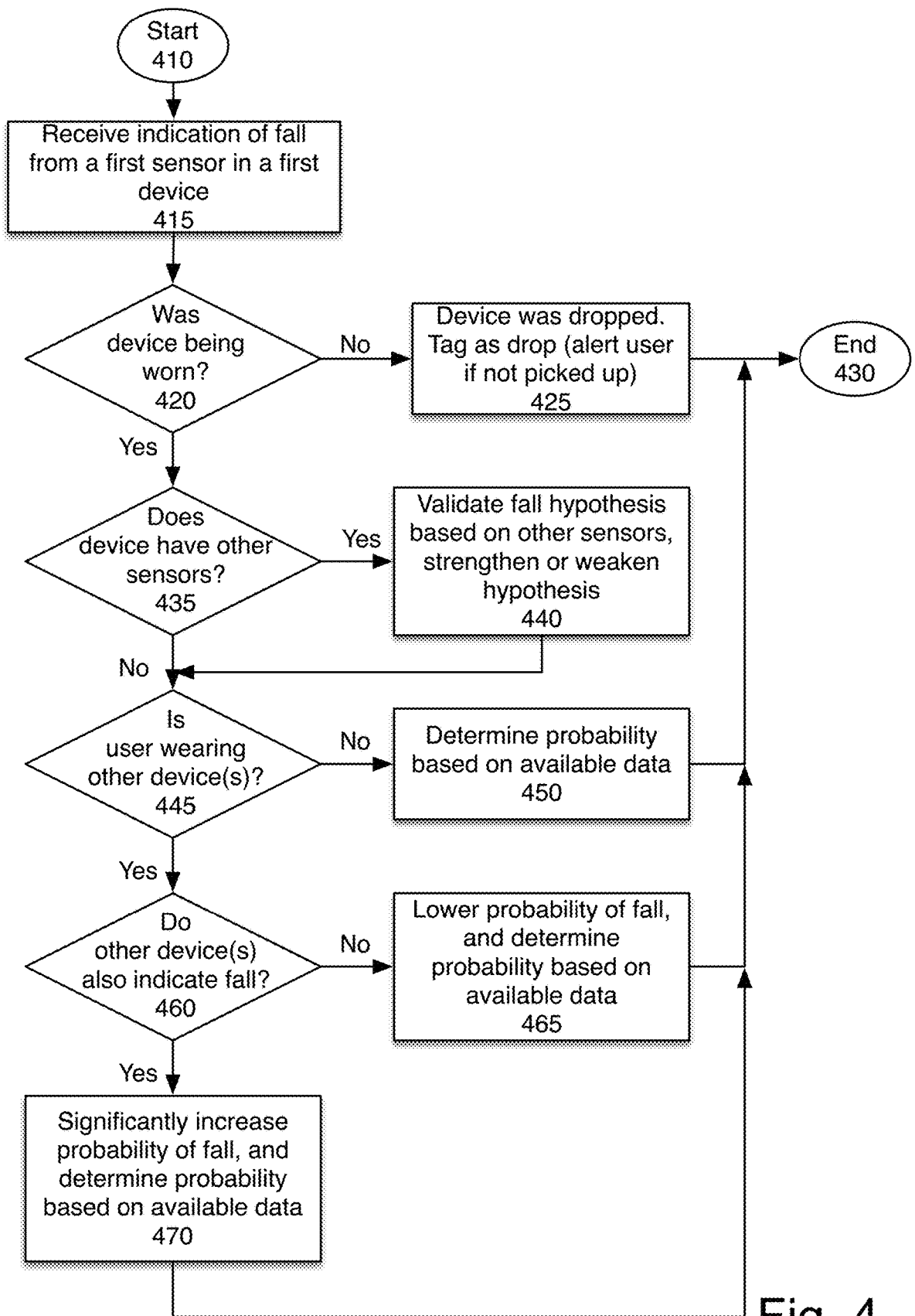
FIG. 4 is a flowchart of one embodiment of using sensor-based data to verify the fall hypothesis.

FIG. 4 is a flowchart of one embodiment of using sensor-based data to verify the fall hypothesis. This flowchart is one embodiment of the implementation of blocks 340 and 350 in FIG. 3.

At block 415, indication of a fall is received from a first sensor in a first device. In one embodiment, this first sensor is an accelerometer or other motion sensor.

At block 420, the process determines whether the device was being worn. Motion data can be used to determine whether a device is on the user's body. Each human body continuously makes micro movements, which can be detected by a motion sensor. If the system determines that the device is not being worn, at block 425, the system classifies the potential fall as a dropped device. In one embodiment, the user may be alerted if the device is not picked up, to ensure it is not accidentally forgotten. The process then ends at block 430. In one embodiment, if the determination of whether or not the device was worn is inconclusive, the system assumes that the device is being worn.

If the device was worn, the process continues to block 435. At block 435, the process determines whether the device has other sensors. If so, at block 440, the fall hypothesis is evaluated based on the data from the other sensors. The other sensors may include for example a microphone, a barometer, gyroscope, heart rate monitor, skin conductance monitor, etc. In one embodiment, the data obtained during the period just before, during, and after the fall is evaluated for each of the available sensors. In one embodiment a subset of sensors is used. In one embodiment, sensors are sequentially evaluated until the probability of an actual fall is below a threshold. For example, if a barometer and accelerometer data together say that the probability of a fall was less than 1%, the system may not utilize the data from the microphone, heart rate monitor, or other sensors.

The results of the evaluation are used to adjust the probability of an actual fall. In one embodiment, if the probability falls below a threshold at any point the system identifies the potential fall as a false alarm and stops the validation process.

The process then continues to block 445. At block 445, the process determines whether the user is wearing another device, or other devices. As noted above, these devices may include mobile device, if the initial sensing was by a body-worn device, or vice versa. As noted above, the data from the additional devices is only evaluated if the additional device is being worn by the user. Note that "worn" in this content means carried by a user, in a pocket, purse, or otherwise on the user's body. While the data may differ if a device is in the user's pocket or if it's around a user's neck, both would reflect sensor data corresponding to a fall, if a fall occurs.

If the user is not wearing another device, at block 450 the total probability of whether the potential fall is an actual fall is evaluated based on the available data. The process of using sensors to validate the potential fall then ends at block 430.

If the user is wearing one or more additional devices, the process continues to block 460. At block 460, the process determines whether the additional device(s) also indicate a fall. If not, the probability of a fall is lowered. The overall probability is then reevaluated based on the totality of sensor data. The process then ends. If the additional devices also indicate a fall, at block 470 the probability of a fall is significantly increased, and the probability is reevaluated based on the data to date. In one embodiment, each of the sensors has an associated reliability rating. In one embodiment, the system goes from the most reliable sensor, to less reliable sensors. In one embodiment, the probability calculation for the sensor is adjusted based on the reliability. For example, an accelerometer is more likely to pick up a fall than a barometer. Some sensors may be used to check for likely adjustments that would indicate that the user did not fall. For example, a thermometer may be used to determine that the user likely dropped the device, based on a difference in temperature indicating that the device is no longer in contact with the user's body.

The process then ends at block 430. In one embodiment, if the probability is above a threshold, the process may mark the potential fall as an actual fall and terminate the validation process. In one embodiment, each additional device's sensor data is evaluated separately, and the probabilities are increased or decreased, as appropriate based on the data.

Figure 5:
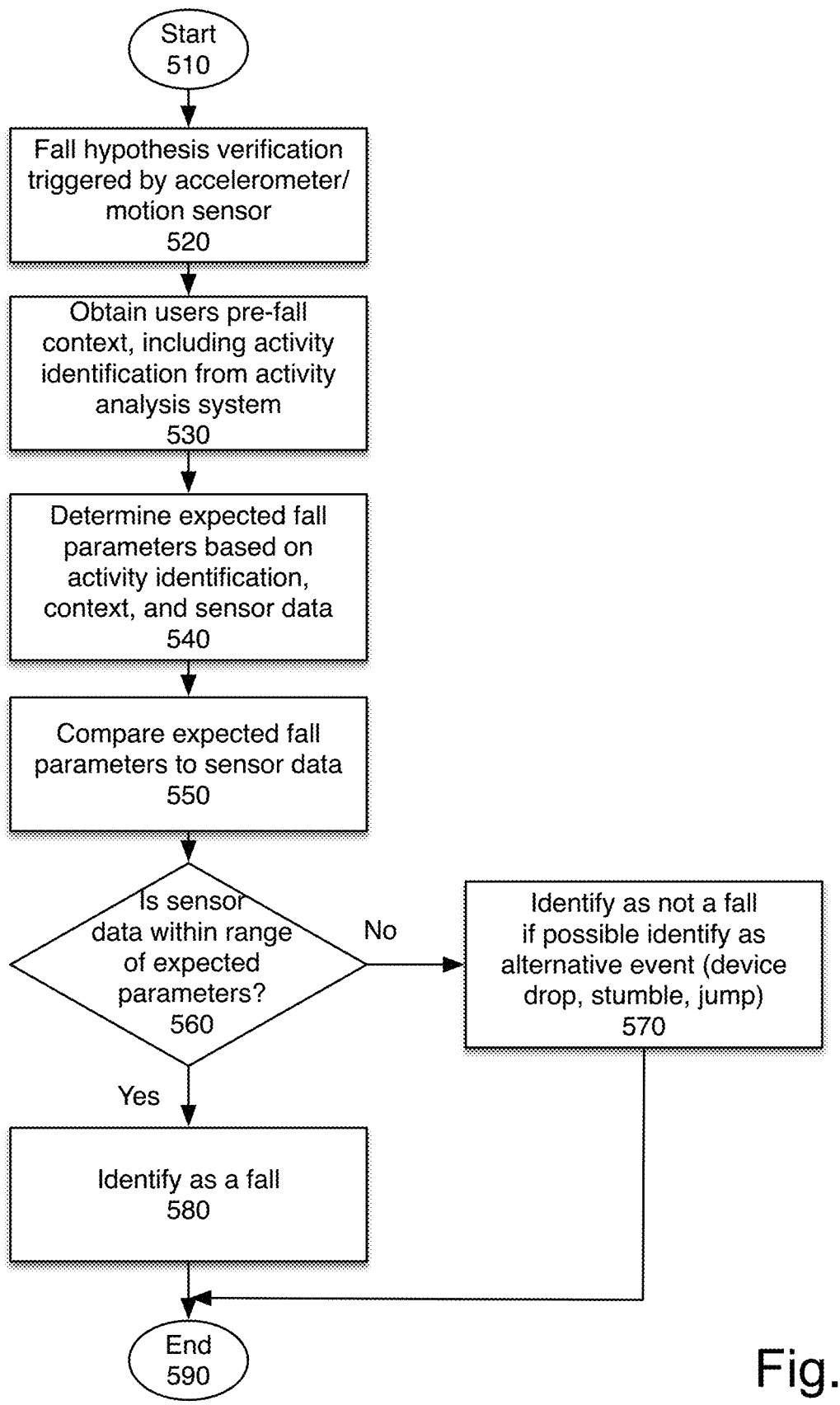
FIG. 5 is a flowchart of one embodiment of using context-based predictive data to verify the fall hypothesis.

FIG. 5 is a flowchart of one embodiment of using context-based predictive data to verify the fall hypothesis. The process starts at block 510. In one embodiment, the process described is one embodiment of implementing blocks 370 and 380 of FIG. 3.

At block 520, the process is triggered by a potential fall determination. In one embodiment, this process may occur after the sensor validation process, and only if the sensor validation process did not have a conclusive answer. In another embodiment, this process may occur prior to the sensor validation process, and the sensor validation process may only occur if this process is not conclusive.

At block 530, activity identification is obtained from the activity analysis system. In one embodiment, the user's devices continuously evaluate the user's current context, including activity identification, local conditions, etc. This is done, in one embodiment, the monitor the user's movement, sleep, and health throughout the day. In one embodiment, the activity identification may distinguish the user activities such as standing, sitting, walking, jogging, running, bicycling, skateboarding, exercising (and optionally differentiating between types of exercises, e.g. free weights v. aerobics v. exercise machine use), and other activities. In one embodiment, the context includes where the devices whose sensors are being used are located, on the user's body. Because data from a sensor in a pocket provides different information than data from a sensor around a user's neck or wrist, evaluating the parameters uses this information, in one embodiment.

At block 540, the expected fall parameters are identified based on the activity identification, context, and sensor data. The fall parameters define the patterns a fall can take, given the user's context and the device location(s). For example, when jogging downhill, a user falling may travel in particular arc, which is quite different from the fall pattern experienced when standing still, sitting, or for that matter walking uphill. By defining the pattern the system is looking for, based on the context including the activity identification, recognition of the correct pattern, and deviations from the pattern, becomes easier. This makes it easier to identify false positives, as well as actual falls.

At block 550, the sensor data is compared to the expected fall parameters, as determined by the context.

At block 560, the system determines whether the sensor data is within range of the expected fall parameters. For example, if the user is standing still, a potential fall with a horizontal travel of 5+ feet on a device in the user's pocket is unlikely to be true.

If the sensor data is outside the range of the parameters, the probability of a fall is adjusted. In one embodiment, the potential fall is identified as not an actual fall. In one embodiment, the system attempts to identify the likely alternative event. Some alternative events that may be identified include a device drop, a device throw/slide/etc., a user stumble, a user jump. The process then ends at block 590. If the sensor data is within the expected parameters, at block 580 the process identifies the potential fall as an actual fall. In one embodiment, the process adjusts the probability of a fall, and then evaluates the overall probability to make the determination whether the potential fall was an actual fall. The process then ends at block 590.

Figure 6:
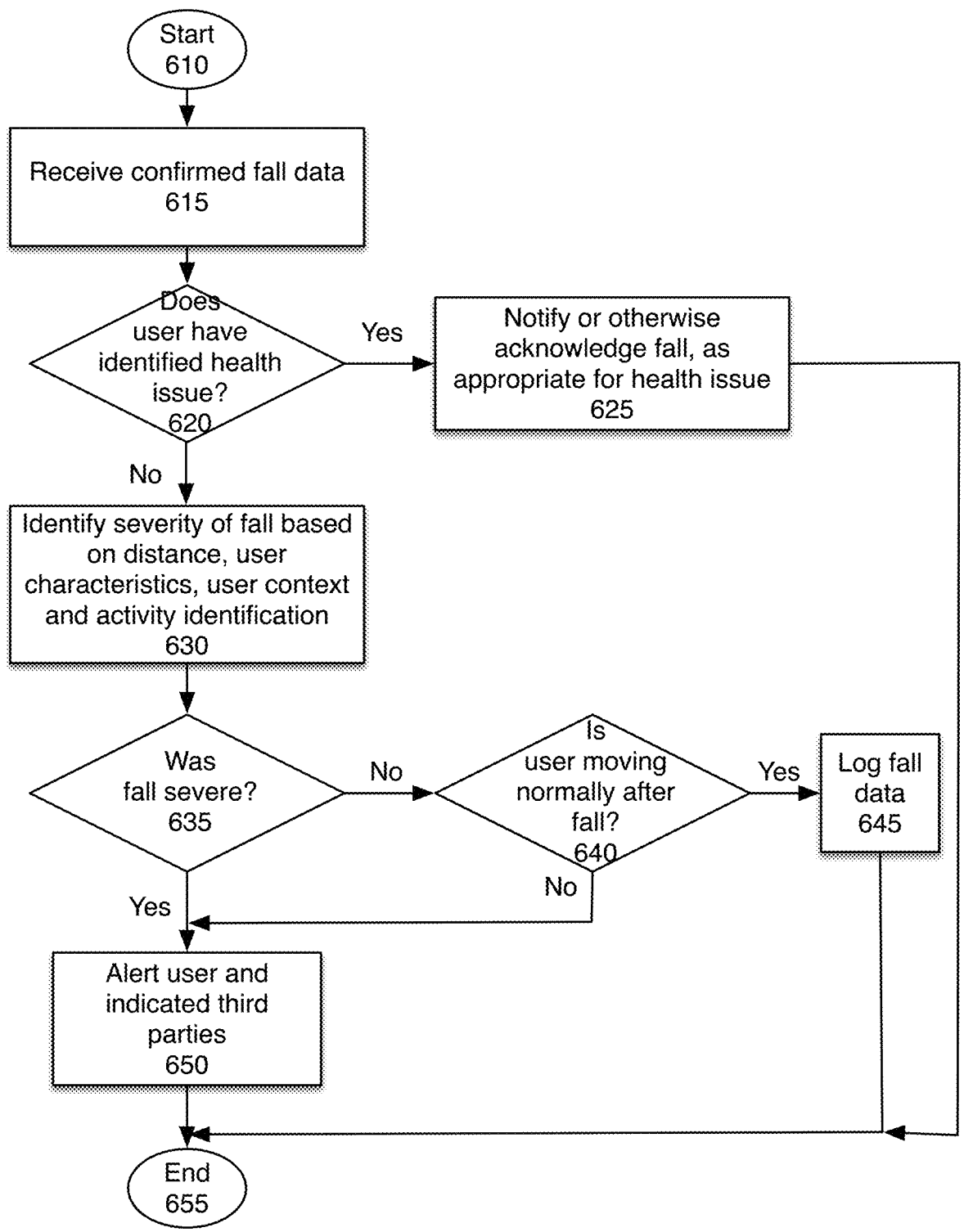
FIG. 6 is a flowchart of one embodiment of reactions to a confirmed fall hypothesis.

FIG. 6 is a flowchart of one embodiment of reactions to a confirmed fall hypothesis. The process starts at block 610. At block 615 the system receives information that there has been a confirmed fall.

At block 620, the process determines whether the user has an identified health issue. There are certain health issues that may impact the user's stability, and may make falls more likely, or more or less risky. If the fall is high risk because of health issues, at block 625 the fall is acknowledged in the way most appropriate for the identified health issue. In one embodiment, if the user's health issue makes falls more risky, the system may alert relevant assistance providers which may include medical professionals. This enables the system to react quickly to falls in vulnerable populations, such as the elderly or stroke victims. The process then ends at block 655. In another embodiment, the process continues, to block 630.

If the user does not have an identified health issue, the process continues directly to block 630. At block 630, the severity of the fall is identified based on one or more of a distance (as measured by the sensors), surface on which the user fell (based on one or more of location data, and sensor data), user characteristics, user context including activity identification. In one embodiment, for example, a fall while bicycling downhill is considered more severe than a fall taken while walking on a level surface. However, the system also takes into account the user's personal characteristics, in one embodiment. For example, a fall may be significantly more serious for someone older or very young, or with certain conditions.

At block 635, the process determines whether the fall was severe. If so, the user and potentially indicated third parties are alerted, at block 650. In one embodiment, when the user initially sets up the system, he or she can specify who to contact in case of a severe fall. In one embodiment, if no other contacts are provided, if the fall is identified as severe, and the user is not moving normally after the fall, emergency services may be contacted. In one embodiment, a user may turn off this feature, or may need to enable this feature. The process then ends at block 655.

If the fall was not classified as severe, at block 635, the process continues to block 640. At block 640, the process determines whether the user is moving normally after the fall. In one embodiment, this may be done by comparing the user's movements to the pre-fall movement data. In one embodiment, normal movement is evaluating not whether the user is moving more slowly but whether the fall has likely had a serious effect on the user. If the user is not moving normally, the process continues to block 650, alerts the user and indicated third parties. If the user is moving normally, the data is logged, at block 645, and the process ends at block 655. In one embodiment, the fall data may be used to adjust the expectations and predictions of the system. In one embodiment, the data is shared with a server, in an anonymized fashion. This server can then use the anonymized data from a large user pool to perfect predictions and improve accuracy, fall identification, fall classification, and alert defaults.

Figure 7:
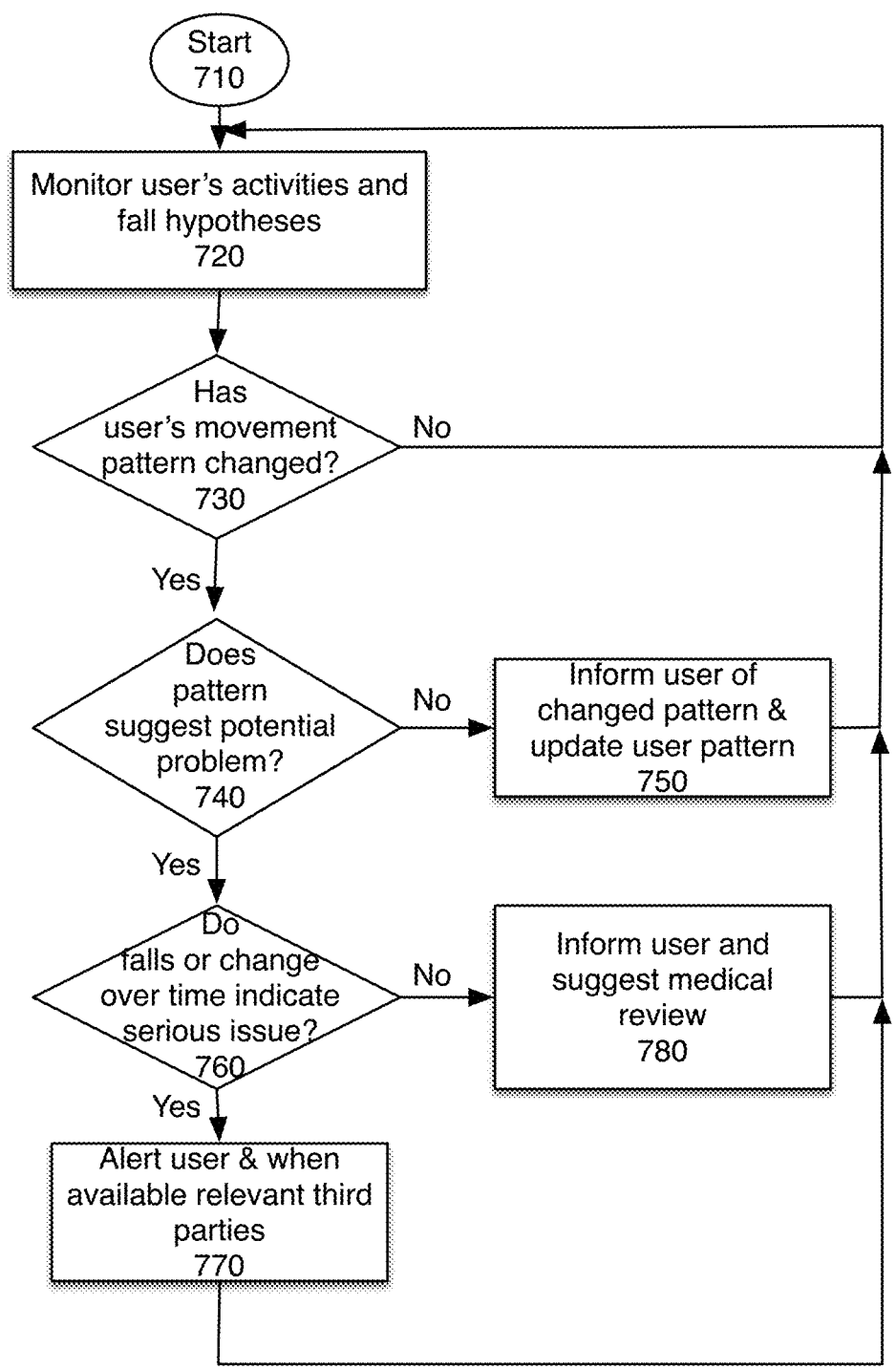
FIG. 7 is a flowchart of one embodiment of long-term movement analysis, including using fall hypothesis.

FIG. 7 is a flowchart of one embodiment of long-term movement analysis, including using fall hypothesis. In one embodiment, this process may run continuously, whether or not a fall is detected. In another embodiment, this process is run responsive to a verified fall. The process starts at block 710.

At block 720, the user's activities are monitored with sensors. In one embodiment any fall hypotheses are evaluated, as described above.

At block 730, the process determines whether the user's movement pattern has changed. An individual user's movement is characteristic. For example, most people have a gait form and cadence for the various types of movement. If no change in the movement is detected, the process returns to block 720, to continue monitoring.

If the user's movement pattern has changed, the process at block 740 determines whether the patter change suggests a potential problem. In one embodiment, short term changes may depend on minor factors such as a change in shoes, a small fall, being tired, etc. However, certain change patterns are indicative of a health problem. For example, after a stroke people lean to and favor one side when they walk or stand. Cognitive decline is associated with a change in the speed and cadence of walking, and an increase in hesitation. Knee, ankle, foot, or hip injuries, which can sometimes be painless or hard to recognize, also change the user's walking pattern.

If the change in pattern does not suggest a potential problem, at block 750, in one embodiment the user is informed of the changed pattern. In one embodiment, the user's pattern is then updated based on the changed movement pattern. This ensures that the same change does not cause repeated alerts. However, in one embodiment, the original pattern is maintained in the system, and new data is compared to not just the most recent data, but also to historical data. One embodiment, the system compares new monitor data to the last most recent data, and prior data. In one embodiment, prior data is pruned over time. For example, every reading for the day is maintained, a limited number of readings for the prior week are maintained (for example 3-4 per day), an even more limited number of readings for the prior month are maintained (for example 5-10/month). In comparing the current data set to the historical movement pattern, the system compares the data to all of the historical data. In one embodiment, if the data matches, within a tolerance, then the comparison may be terminated. However, if the data has changed, the comparison may extended to historical data. This is to ensure that movement patterns don't shift over time, indicating potential neurological, physical, other issues.

This enables the system to identify a gradual decline relatively quickly. In one embodiment, the system attempts to identify gradual declines before before they result in permanent harm, which individually would not suggest a potential problem, can be evaluated cumulatively. The process then returns to block 720.

If the pattern change suggests a potential problem, at block 740, the process continues to block 760. At block 760, the process determines whether falls or changes in the movement pattern over time indicate a serious issue. If not, at block 780, in one embodiment the user is informed, and a medical review is suggested. This may be the path, for example, if the system determines that the pattern of movement changes and falls indicates cognitive decline, or similar long-term serious issues, without immediate urgency. In one embodiment, designated third parties may also be informed. The process continues to block 720 to continue monitoring.

If the falls or pattern of change indicate an urgent and serious issue, at block 770, the user is alerted, as are relevant third parties. In one embodiment, if the identified problem is sufficiently severe, emergency services may also be contacted. For example, a user having a stroke, heart attack, asthma attack, or other medical incident often moves in a characteristic and different way. In such a case, calling emergency services may save the user's life. In one embodiment, the user may set preferences, for thresholds to contact third parties, including emergency services. The process continues monitoring, at block 720.

Of course, though the figures above use a flowchart structures to describe the process, the system may be interrupt driven, and the various actions may occur concurrently or independently of each other. For example, the system may continuously monitor for changes to the user's movement pattern, initiating the process of FIG. 7 when such a change is detected. Additionally, the ordering of the use of additional sensors within the device, additional sensors for other devices, and activity and context based evaluations may be altered. Furthermore, some systems may only use a subset of these possible validation methodologies. The ordering of the steps is generally arbitrary in all of the above flowcharts, and may be changed in an implementation. Furthermore, additional steps may be inserted, or some steps may be removed from the process without altering the present invention.

Figure 8:
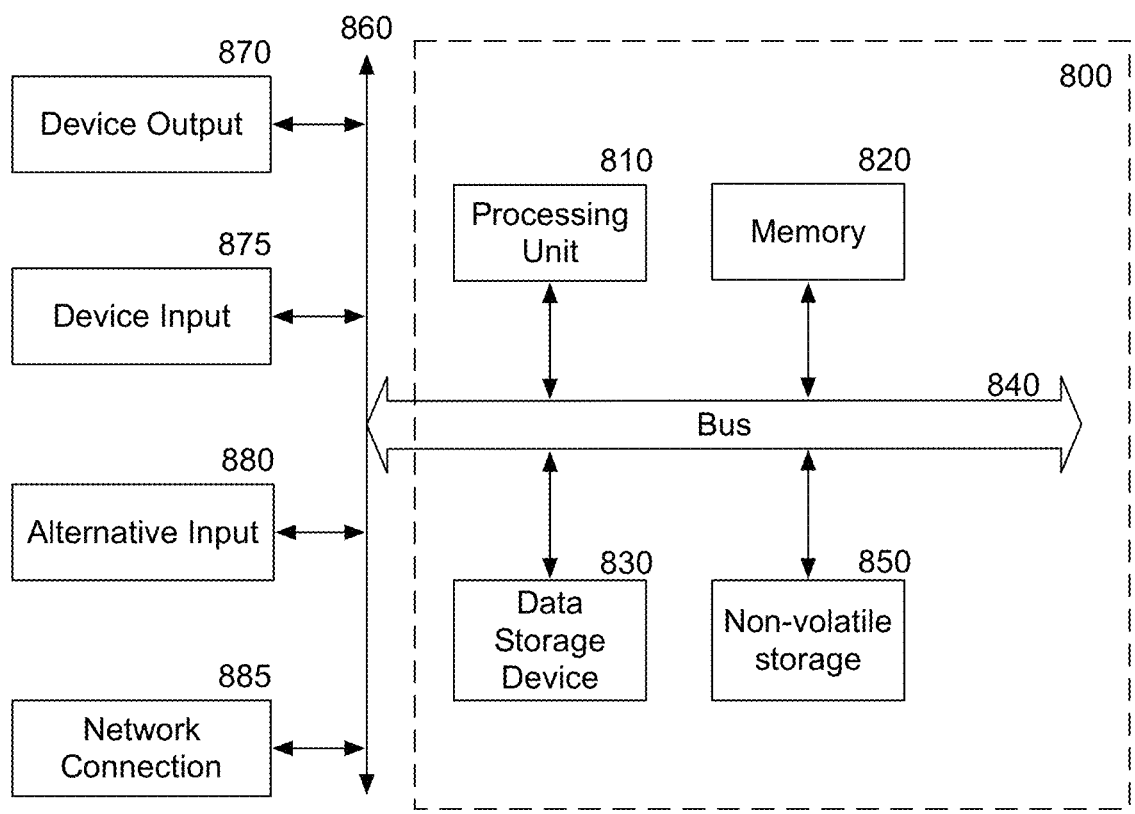
FIG. 8 is a block diagram of one embodiment of a computer system that may be used with the present invention.

FIG. 8 is a block diagram of one embodiment of a computer system that may be used with the present invention. It will be apparent to those of ordinary skill in the art, however that other alternative systems of various system architectures may also be used.

The data processing system illustrated in FIG. 8 includes a bus or other internal communication means 840 for communicating information, and a processing unit 810 coupled to the bus 840 for processing information. The processing unit 810 may be a central processing unit (CPU), a digital signal processor (DSP), or another type of processing unit 810.

The system further includes, in one embodiment, a random access memory (RAM) or other volatile storage device 820 (referred to as memory), coupled to bus 840 for storing information and instructions to be executed by processor 810. Main memory 820 may also be used for storing temporary variables or other intermediate information during execution of instructions by processing unit 810.

The system also comprises in one embodiment a read only memory (ROM) 850 and/or static storage device 850 coupled to bus 840 for storing static information and instructions for processor 810. In one embodiment, the system also includes a data storage device 830 such as a magnetic disk or optical disk and its corresponding disk drive, or Flash memory or other storage which is capable of storing data when no power is supplied to the system. Data storage device 830 in one embodiment is coupled to bus 840 for storing information and instructions.

The system may further be coupled to an output device 870, such as a cathode ray tube (CRT) or a liquid crystal display (LCD) coupled to bus 840 through bus 860 for outputting information. The output device 870 may be a visual output device, an audio output device, and/or tactile output device (e.g. vibrations, etc.)

An input device 875 may be coupled to the bus 860. The input device 875 may be an alphanumeric input device, such as a keyboard including alphanumeric and other keys, for enabling a user to communicate information and command selections to processing unit 810. An additional user input device 880 may further be included. One such user input device 880 is cursor control device 880, such as a mouse, a trackball, stylus, cursor direction keys, or touch screen, may be coupled to bus 840 through bus 860 for communicating direction information and command selections to processing unit 810, and for controlling movement on display device 870.

Another device, which may optionally be coupled to computer system 800, is a network device 885 for accessing other nodes of a distributed system via a network. The communication device 885 may include any of a number of commercially available networking peripheral devices such as those used for coupling to an Ethernet, token ring, Internet, or wide area network, personal area network, wireless network or other method of accessing other devices. The communication device 885 may further be a null-modem connection, or any other mechanism that provides connectivity between the computer system 800 and the outside world.

Note that any or all of the components of this system illustrated in FIG. 8 and associated hardware may be used in various embodiments of the present invention.

It will be appreciated by those of ordinary skill in the art that the particular machine that embodies the present invention may be configured in various ways according to the particular implementation. The control logic or software implementing the present invention can be stored in main memory 820, mass storage device 830, or other storage medium locally or remotely accessible to processor 810.

It will be apparent to those of ordinary skill in the art that the system, method, and process described herein can be implemented as software stored in main memory 820 or read only memory 850 and executed by processor 810. This control logic or software may also be resident on an article of manufacture comprising a computer readable medium having computer readable program code embodied therein and being readable by the mass storage device 830 and for causing the processor 810 to operate in accordance with the methods and teachings herein.

The present invention may also be embodied in a handheld or portable device containing a subset of the computer hardware components described above. For example, the handheld device may be configured to contain only the bus 840, the processor 810, and memory 850 and/or 820.

The handheld device may be configured to include a set of buttons or input signaling components with which a user may select from a set of available options. These could be considered input device #1 875 or input device #2 880. The handheld device may also be configured to include an output device 870 such as a liquid crystal display (LCD) or display element matrix for displaying information to a user of the handheld device. Conventional methods may be used to implement such a handheld device. The implementation of the present invention for such a device would be apparent to one of ordinary skill in the art given the disclosure of the present invention as provided herein.

The present invention may also be embodied in a special purpose appliance including a subset of the computer hardware components described above, such as a kiosk or a vehicle. For example, the appliance may include a processing unit 810, a data storage device 830, a bus 840, and memory 820, and no input/output mechanisms, or only rudimentary communications mechanisms, such as a small touch-screen that permits the user to communicate in a basic manner with the device. In general, the more special-purpose the device is, the fewer of the elements need be present for the device to function. In some devices, communications with the user may be through a touch-based screen, or similar mechanism. In one embodiment, the device may not provide any direct input/output signals, but may be configured and accessed through a website or other network-based connection through network device 885.

It will be appreciated by those of ordinary skill in the art that any configuration of the particular machine implemented as the computer system may be used according to the particular implementation. The control logic or software implementing the present invention can be stored on any machine-readable medium locally or remotely accessible to processor 810. A machine-readable medium includes any mechanism for storing information in a form readable by a machine (e.g. a computer). For example, a machine readable medium includes read-only memory (ROM), random access memory (RAM), magnetic disk storage media, optical storage media, flash memory devices, or other storage media which may be used for temporary or permanent data storage. In one embodiment, the control logic may be implemented as transmittable data, such as electrical, optical, acoustical or other forms of propagated signals (e.g. carrier waves, infrared signals, digital signals, etc.).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

We claim:

1. A method comprising:
    receiving, by a computing device, sensor data from a motion sensing device associated with a user;
    storing the sensor data in a buffer memory;
    identifying a user context, the user context including an identified pre-fall activity based on the sensor data;
    after identifying the user context, identifying a potential fall based on motion sensing data read from the buffer memory;
    detecting a presence of body micro movements of the user after the potential fall;
    determining, based on a continued presence of the detected body micro movements after the potential fall, that the motion sensing device is currently worn by the user;
    in response to determining that the motion sensing device is currently worn by the user, assigning a probability of the potential fall being an actual fall based on data from an additional sensor; and
    updating the probability of the potential fall being the actual fall based on the user context, the user context including the identified pre-fall activity, wherein the updating the probability of the potential fall being the actual fall further comprises:
        utilizing a machine learning system to determine a probability of a false positive identification for the potential fall based on the identified pre-fall activity, the machine learning system trained on cumulative training data from a plurality of users' systems, the cumulative training data comprising pre-fall activities of the plurality of users, and the machine learning system being trained to output the probability of a false positive identification for a particular pre-fall activity, and
        updating the determined probability to an updated probability based on the probability of false positive identifications and the identified pre-fall activity of the user.

2. The method of claim 1, further comprising:
in response to the updated probability exceeding a threshold, sending a fall alert to another device.

3. The method of claim 1, further comprising:
in response to determining that the motion sensing device is a body-worn device not currently worn by the user, classifying the potential fall as a dropped device.

4. The method of claim 1, wherein the data from the additional sensor comprises one of: barometric data, gyroscopic data, or sound data.

5. A method of determining whether a user has fallen comprising:
detecting a potential fall using a motion sensing device worn by the user;
identifying a pre-fall activity of the user prior to the potential fall;
detecting, by the motion sensing device, body micro movements of the user;
determining, based on a continued presence of the detected body micro movements after the potential fall, that the motion sensing device that detected the body micro movements is a body-worn device currently worn by the user; and
in response to determining that the motion sensing device is the body-worn device currently worn by the user, evaluating the potential fall to determine whether the potential fall is an actual fall based on user context, the user context including the identified pre-fall activity, the evaluating comprising:
utilizing a machine learning system to determine a probability of a false positive identification for the potential fall based on the identified pre-fall activity, the machine learning system trained on cumulative training data from a plurality of users' systems, the cumulative training data comprising pre-fall activities of the plurality of users, and the machine learning system being trained to output the probability of the false positive identification for a particular pre-fall activity, and
calculating a probability that the potential fall was an actual fall based on the probability of the false positive identifications and the identified activity of the user.

6. The method of claim 5, wherein the evaluating utilizes data from an additional sensor.

7. The method of claim 5, further comprising receiving input from a plurality of additional sensors and wherein the evaluating comprises sequentially evaluating the plurality of additional sensors until the probability of an actual fall meets a threshold.

8. The method of claim 7, wherein the plurality of additional sensors comprise one or more of: gyroscope, barometer, microphone, blood sugar sensor, blood pressure sensor, and blood oxygenation sensor.

9. The method of claim 5, wherein the identified activity comprises one of: sitting, standing, jogging, bicycling, and skateboarding.

10. A method of determining whether a user has fallen comprising:
detecting a potential fall based on data from a body-worn motion sensing device worn by the user;
detecting, by the motion sensing device, body micro movements of the user;
determining, based on a continued presence of the detected body micro movements after the potential fall, that the motion sensing device is currently worn by the user;
in response to determining that the motion sensing device is the body-worn device is currently worn by the user:
assigning a probability to a potential fall based on user context, the user context including an identified pre-fall activity prior to the potential fall,
updating the probability of the potential fall being an actual fall based on data from an additional sensor,
wherein the updating the probability of the potential fall being an actual fall further comprises:
utilizing a machine learning system to determine a probability of a false positive identification for the potential fall based on the identified pre-fall activity, the machine learning system trained on cumulative training data from a plurality of users' systems, the cumulative training data comprising pre-fall activities of the plurality of users, and the machine learning system being trained to output the probability of a false positive identification for a particular pre-fall activity, and
updating the determined probability to an updated probability based on the probability of false positive identifications and the identified pre-fall activity of the user.

11. The method of claim 10, wherein the additional sensor is located in an additional device.

12. The method of claim 10, wherein the additional sensor comprises a barometer.

13. The method of claim 10, wherein the additional sensor comprises a microphone.

14. The method of claim 10, wherein the additional sensor performs one of: blood sugar analysis, blood pressure analysis, and blood oxygenation analysis.

15. The method of claim 10, wherein the identified pre-fall activity comprises one of: sitting, standing, jogging, bicycling, and skateboarding.

16. The method of claim 10, wherein the probability is a percentage value between 0 and 99%.

17. The method of claim 10, wherein updating the probability of the potential fall being an actual fall based on user context comprises:
determining a false positive indication probability for the identified pre-fall activity prior to the potential fall, and adjusting the probability based on the false positive indication probability.

18. The method of claim 10, further comprising:
utilizing location and environmental context data to validate the potential fall.

19. The method of claim 10, further comprising sequentially evaluating a plurality of additional sensors until the probability of an actual fall meets a threshold.

* * * * *